Dec. 30, 1969     V. W. LYM     3,487,461
FREQUENCY TRACKING CIRCUIT
Filed March 22, 1968     2 Sheets-Sheet 1
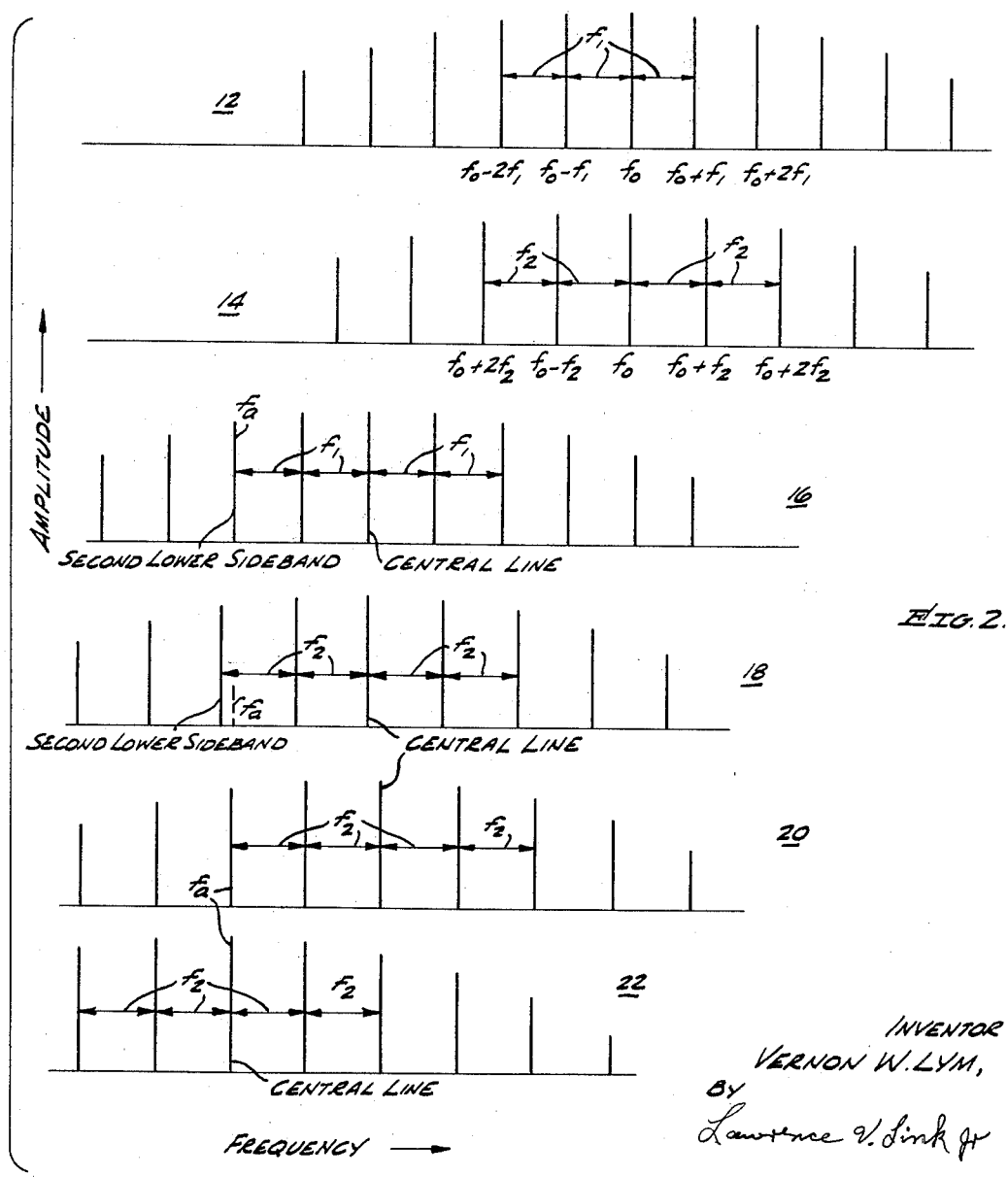

Dec. 30, 1969   V. W. LYM   3,487,461
FREQUENCY TRACKING CIRCUIT
Filed March 22, 1968   2 Sheets-Sheet 2
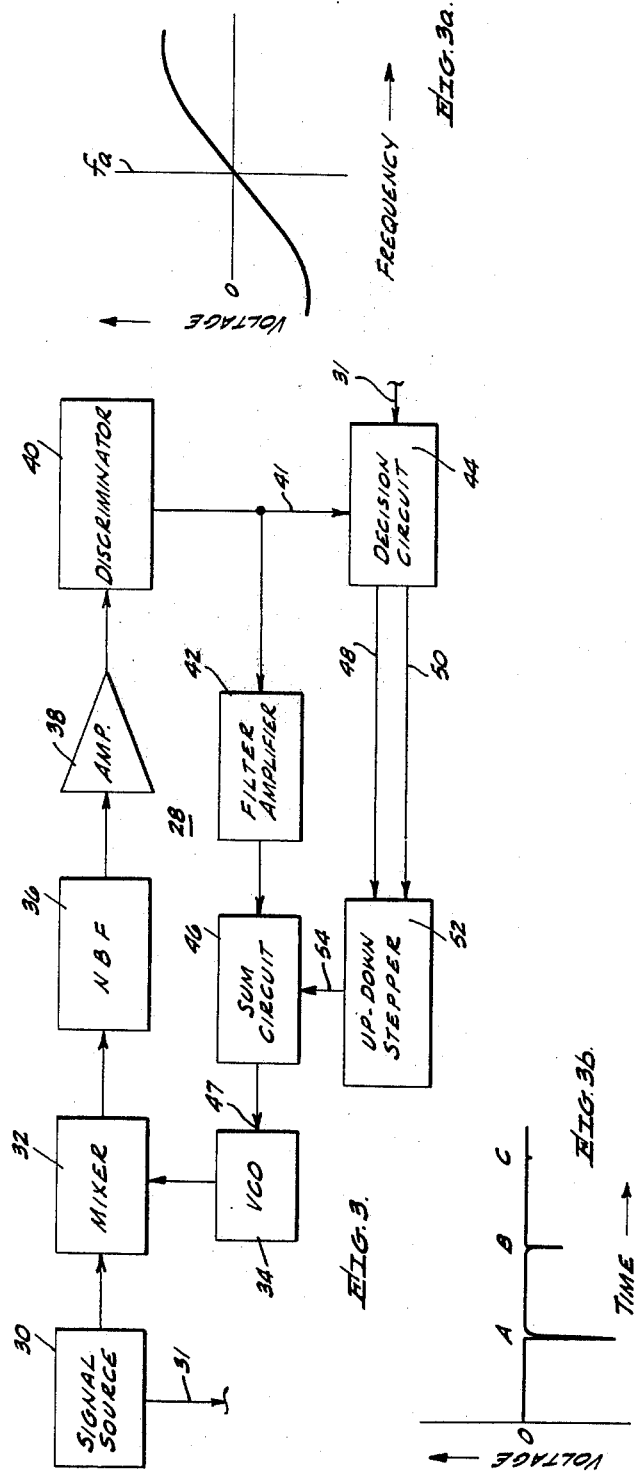
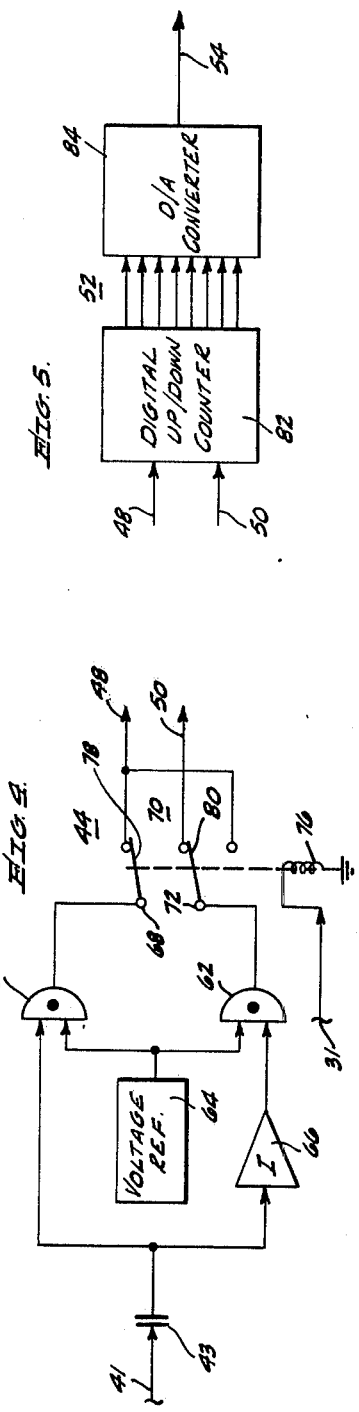

United States Patent Office 3,487,461
Patented Dec. 30, 1969

3,487,461
FREQUENCY TRACKING CIRCUIT
Vernon W. Lym, Torrance, Calif., assignor to Hughes Aircraft Company, Culver City, Calif., a corporation of Delaware
Filed Mar. 22, 1968, Ser. No. 716,703
Int. Cl. G01s 9/02
U.S. Cl. 343—7                                    8 Claims

ABSTRACT OF THE DISCLOSURE

A device for frequency tracking a selected spectral line of a coherent pulsed signal. The pulsed signal is heterodyned with the output signal of a voltage controlled oscillator, and then filtered so as to apply only a single spectral line to a frequency discriminator. The output signal from the discriminator in turn controls the frequency of the voltage controlled oscillator so that the input signal to the discriminator is at a selected frequency. During periods of change in the repetition rate of the pulsed signal, a decision circuit develops control signals in response to transient voltages in the discriminator's output signal. The control signals, which are representative of whether the voltage controlled oscillator is locked to (controlled in response to) a spectral line above or below a selected spectral line, are applied to an input circuit of an up/down stepper. The voltage controlled oscillator is also coupled to an output circuit of the up/down stepper and responds thereto so as to increment its output signal frequency towards the correct frequency for locking onto the selected spectral line.

BACKGROUND OF THE INVENTION

This invention relates to frequency tracking circuits and particularly to frequency tracking circuits for tracking a selected spectral line of a signal composed of a plurality of discrete spectral lines.

In some signal analysis systems it is required to first translate the signal to be analyzed to a predetermined position in the frequency band so that analysis may be accomplished by filters having fixed frequency characteristics. Coherent pulsed signals which are repetitive at a given sampling rate, such as pulsed radar signals, for example, exhibit a lined spectrum with the spectral lines repeating at multiples of the sampling rate and with only the frequency of the central spectral line being insensitive to the sampling rate. In prior art frequency tracking circuits, a continuous wave (CW) oscillator is locked to (controlled as a function of) an undetermined one of the plurality of discrete spectral lines of the lined spectrum. The CW signal generated by the oscillator is mixed with the pulsed signal to provide frequency translation of the pulsed signal. However, for signals that have periodic changes in the sampling rate, for example, in radar systems where the pulse repetition rate is varied as a countermeasure or to increase the probability of detection, signal analysis is seriously degraded if any spectral line but the central line is frequency tracked. The just mentioned degradation is due to the fact that the frequency of all spectral lines but the central spectral line are a function of the pulse repetition frequency (sampling rate). If a noncentral line is tracked, undesirable transient signals are induced in the signal analysis circuits when the sampling rate is varied. Therefore, frequency tracking circuits that include means for frequency tracking only the pulse repetition rate insensitive line (central spectral line) would be a significant contribution to the art.

SUMMARY OF THE INVENTION

Briefly in accordance with the principles of the subject invention, a coherent pulsed signal to be analyzed is heterodyned in a mixer with the output signal of a voltage control oscillator. The output signal of the mixer is filtered by a narrow bandwidth filter having a passband such that only a single spectral line of the signal is applied to a frequency discriminator. If the mean frequency of the signal applied to the discriminator is not at a predetermined frequency, the discriminator generates an error signal which is coupled to the voltage control oscillator. In response to the error signal the output frequency of the voltage controlled oscillator is adjusted so that frequency of the signal applied to the discriminator from the mixer will be at the predetermined frequency. A decision circuit monitors the discriminator's output signal (error signal) and senses the transients therein during pulse repetition change periods. In response to the transient signals the decision circuit determines if the voltage control oscillator is tracking a spectral line above or below the pulse repetition frequency insensitive spectral line (the central spectral line). The decision circuit generates control signals which are applied to an up/down stepper circuit and in response thereto the up/down stepper increments the frequency of the voltage control oscillator by a value equal to the mean frequency spacing between spectral lines. During each pulse repetition frequency change interval, the frequency tracking circuit of the subject invention repeats the just described procedure until the circuit is locked to the central spectral line. When the circuit is locked to the central spectral line the discriminator's output signal does not vary during pulse repetition frequency changes.

It is therefore an object of the invention to provide a frequency tracking circuit which tracks the central spectral line of a coherent pulsed signal.

It is another object of the subject invention to provide a frequency tracking circuit which senses when a spectral line other than the central spectral line has been acquired and which is self-adjusting so as to frequency track the central spectral line.

BRIEF DESCRIPTION OF THE DRAWINGS

The novel features of this invention, as well as the invention itself, will be best understood from the accompanying description taken in connection with the accompanying drawings in which like reference character refer to like part and in which:

FIG. 1 is a voltage versus time diagram of an input signal that may be processed by the frequency tracking circuit in accordance with the subject invention;

FIG. 2 shows power amplitude versus frequency waveforms of the signal shown in FIG.1;

FIG. 3 is a block diagram of the frequency tracking circuit in accordance with the principles of the subject invention;

FIG. 3a is an output voltage versus input frequency diagram of a discriminator circuit of FIG. 3.

FIG. 3b is a voltage versus time diagram of the signals developed by the discriminator of FIG. 3;

FIG. 4 is a block diagram of a decision circuit that may be utilized in the frequency tracking circuit of FIG. 3;

FIG. 5 is a block diagram of an up/down stepper that may be utilized in the frequency tracking circuit of FIG. 3.

DESCRIPTION OF THE PREFERRED EMBODIMENT

The concepts of the subject invention may be better understood by first referring to FIGS. 1 and 2 which show characteristics of a coherent pulsed signal that may be processed by the frequency tracking circuit of the subject invention. The waveform 10 of FIG. 1 shows a voltage versus time diagram of a series of voltage pulses at a frequency $f_0$. The pulses are separated by equally spaced time intervals T and therefore have a pulse repetition frequency of $1/T$. The spectrum of a waveform 12 of FIG. 2 shows the power amplitude versus frequency distribution for the signal depicted in FIG. 1 where T is equal to $T_1$. As shown in the waveform 12 of FIG. 2, the energy of the voltage pulses is distributed in discrete spectral lines with the central line being at the carrier frequency $f_0$, and with a plurality of equally spaced spectral lines above and below the frequency $f_0$. The spacing in the frequency dimension of the spectral lines of waveform 12 is equal to the pulse repetition frequency $f_1$ (equal to $1/T_1$). Therefore the energy in the signal of waveform 10 (FIG. 1) is distributed at discrete frequencies centered at the carrier frequency $f_0$ and separated by frequency intervals which are equal to the pulse repetition frequency. Waveform 14 of FIG. 2 shows the amplitude versus frequency spectrum of the signal shown in FIG. 1 when the pulse repetition frequency is $f_2$ (equal to $1/T_2$). It may be observed that the central and largest spectral line is located at the frequency $f_0$ in both waveforms 12 and 14, but that in waveform 14 the other spectral lines are separated by the frequency interval $f_2$. Therefore when the sampling rate or the pulse repetition frequency of a signal is varied, there is a change in the frequencies at which the energy in that signal is distributed except for the central spectral line (sometimes referred to as the pulse repetition frequency insensitive line) which always remains located at the carrier frequency.

One function of frequency tracking circuits is to translate a signal applied thereto from one portion of the frequency spectrum to a different portion thereof, for example, from the intermediate frequency (IF) band to the video frequency band. For coherent pulsed signals, as can be seen from waveforms 12 and 14 of FIG. 2, the energy is distributed at a plurality of discrete spectral lines and therefore an ambiguity can exist as to which spectral line the prior art frequency tracking circuits have acquired and are locked onto (being controlled in response to). This just described ambiguity is illustrated in wave forms 16, 18, and 20 of FIG. 2.

Referring first to the waveform 16, it is assumed that a frequency tracking circuit has acquired the second lower spectral sideband which it is maintaining at the frequency $f_a$. At the time that the pulse repetition frequency is switched from the frequency $f_1$ to $f_2$ the energy in the second lower sideband is shifted to a new frequency as indicated by the waveform 18 and the frequency tracking circuit reacts to re-position the sideband to the desired predetermined frequency $f_a$, as shown in the waveform 20. From the aforementioned sequence it may be seen that upon a change in the pulse repetition frequency that the conventional frequency tracking circuits have to readjust and signal analysis in a system incorporating prior art devices is degraded due to the transients resulting therefrom.

The frequency tracking circuit in accordance with the subject invention detects the aforementioned transient voltage and steps the frequency tracking circuit one spectral line at a time in the correct spectral direction until the circuit is locked to the central (pulse repetition frequency insensitive) line as shown in the waveform 22 of FIG. 2. After this has been accomplished, the undesirable transients will no longer be generated when the pulse repetition frequency is varied and signal analysis will be greatly enhanced. This just described feature of the subject invention finds many applications in the field of signal analysis. One such application is in pulsed Doppler radar systems in which the spectral region between any two spectral lines contains substantially all of the desired Doppler target information so that only one interline region need be analyzed. However, it is also required in pulse Doppler radars to systematically or randomly vary the pulse repetition frequency as an electronic countermeasure or to enhance moving target detection probabilities by increasing the chances that a moving target will be outside of a frequency zone that contains clutter (undesirable received energy) power.

In the interest of clarity, the signal pulses of FIG. 1 have been presented as consisting of only a single carrier frequency, that results in a lined spectrum at discrete frequencies. However, it will be understood that the signal of FIG. 1 may consist of a plurality of carrier frequencies (such as received radar signal having Doppler frequency shifts impressed thereon) which result in a spectrum in which each spectral line has a finite width in the frequency domain.

Reference is now directed to FIG. 3 which shows a preferred embodiment of a frequency tracking circuit 28 in accordance with the subject invention. The pulsed input signal (waveform 10, FIG. 1) is applied from a signal source 30 to one input terminal of a mixer 32. The input signal is heterodyned in the mixer 32 with the output signal of a voltage controlled oscillator 34. The output signal from the mixer 32 is applied to a narrow bandwidth filter 36, which filter has a bandwidth so as to transmit only a single spectral line. The output signal from the narrow band filter 36 is amplified in a conventional amplifier 38 and then applied to an input circuit of a conventional frequency discriminator 40. The discriminator 40 provides an output signal which is proportional to the deviation of the frequency of the input signal from a predetermined frequency, for example $f_a$.

By way of illustration, FIG. 3a shows an example of the output voltage-input frequency characteristics of the discriminator 40. In the example of FIG. 3a, the discriminator 40 is mechanized so that if the frequency of the input signal to the discriminator is above a selected value, $f_a$, then a positive output signal is produced. If the input frequency is equal to $f_a$ the output signal is zero and if the input frequency is below $f_a$ a negative output voltage is produced.

The output signal of the discriminator 40 is applied in parallel to a filter amplifier 42 and to a decision circuit 44. The filter amplifier 42 amplifies and filters (integrates) the output signal from the discriminator 40 and then applies the filtered signal to a summation circuit 46. The output signal from the summation circuit 46 is applied to an input circuit 47 of the voltage control oscillator 34. In response to the signal applied to the circuit 47, the voltage control oscillator 34 varies its output frequency so that the spectral line which is transmitted through the narrow band filter 36 is positioned precisely at the predetermined frequency, for example $f_a$. If the frequency of the signal applied to discriminator 40 deviates from the predetermined frequency $f_a$, the discriminator generates an output signal of the proper amplitude and polarity such that after being integrated by the filter 42, the voltage is the correct value to adjust the voltage controlled oscillator to the correct frequency. Therefore the spectral line transmitted through the narrow band filter 36 is centered at the desired position (for example frequency $f_a$) in the frequency band.

At the time the pulse repetition frequency of the signal source 30 is changed, the output signal from the discriminator may increase or decrease depending on whether the pulse repetition frequency was increased or decreased. FIG. 3b shows the output voltage of the discriminator 40 as a function of time for three pulse repetition frequency change intervals A, B, and C. It will be assumed that at time A the tracking circuit 28 is locked to the second lower sideband (waveform 16 of FIG. 2) and that the pulse repetition frequency had just been increased. As a result of the increase in pulse repetition frequency the second lower sideband spectral line decreases in frequency (waveform 18 of FIG. 2) and the discriminator 40 produces a negative output signal (FIG. 3b). As will be explained subsequently in response to this negative output signal the tracking circuit 28 will jump one spectral line and begin to track the first lower sideband spectral line. At time B it will be assumed that the pulse repetition frequency is again increased and the discriminator 40 will produce a negative output pulse that again will cause the tracking circuit 28 to jump to the next higher spectral line. Therefore, for the present example, the tracking circuit 28 is now tracking the central spectral line (waveform 22 of FIG. 2) and at time C there will be no transient voltage produced by the discriminator 40 when the pulse repetition frequency is changed and the circuit 28 will continue stable tracking operations.

The decision circuit 44 has applied thereto a logic signal coupled from the signal source 30 on the lead 31. The logic signal is indicative of whether the pulse repetition frequency has been increased or decreased. The decision circuit 44 senses the polarity of the transient signal in the output signal of the discriminator circuit 40 and the polarity of the logic signal, to generate first and second control signals on output leads 48 and 50, respectively, both of which leads are coupled to an up/down stepper 52. In response to the first control signal applide on the lead 48, the up/down stepper 52 increases its output voltage by a given discrete interval and in a similar manner when the second control signal is applied to the output lead 50 of the decision circuit 44, the up/down stepper 52 decreases the potential applied to the summation circuit 46 by a predetermined selected voltage increment. The output signal from the up/down stepper 52 is applied on the lead 54 to the summation circuit 46. In response to the output signal from the stepper 52 the output frequency of the voltage control oscillator 34 is incremented by a frequency interval which is substantially equal to the average pulse repetition frequency of the signal to be analyzed by the system of the subject invention. Therefore, the decision circuit 44 senses whether the frequency tracking circuit is tracking the central pulse repetition frequency insensitive spectral line; and if it is not the decision circuit determines whether a spectral line below or above the central line is being tracked. Further, the decision circuit 44 generates the correct control signal to cause the up/down stepper 52 to produce the necessary voltage so as to increment the output frequency, of the voltage controlled oscillator 34, a selected frequency interval. In response to the output frequency of the voltage controlled oscillator, the frequency tracking circuit 28 of the subject invention locks onto an adjacent spectral line closer to the pulse repetition frequency insensitive line (control line). The frequency tracking circuit 28 of the subject invention repeats the just described operational sequence after each pulse repetition frequency change until the circuit acquires (is locked to) the central spectral (pulse repetition frequency insensitive) line. After the central line is acquired no transient signals are produced during pulse repetition frequency changes and stable system operation is maintained.

The decision circuit 44 that may be utilized in the system of the subject invention is shown in greater detail in FIG. 4. Referring now to FIG. 4, the output signal from the discriminator 40 is applied on a lead 41, through a capacitor 43, to an AND gate 60 and a conventional inverter 66. The output signal from the inverter 66 is applied to an AND gate 62 and a positive reference signal is applied to the AND gates 60 and 62 from a voltage source 64. The output signals from the AND gates 60 and 62 are applied to terminals 68 and 72, respectively, of a relay 70. The relay 70 is controlled by a coil 76, one terminal of which is at a ground or reference potential, and the pulse repetition frequency logic signal (from the signals source 30, FIG. 3) is applied to the ungrounded terminal of the coil. During the intervals that the pulse repetition frequency is decreased, the signal applied to the coil 76 is at a zero potential and the switch 70 is in the position shown. During the time periods that the pulse repetition frequency is increased, a positive potential is applied from the signal source 30 to the coil 76 and the switch 70 is in the opposite position from that shown. Output terminals 80 and 78 of the decision circuit 44 are then coupled to leads 48 and 50 (FIG. 3), respectively.

A more detailed mechanization of the up/down stepper 52 is shown in FIG. 5. Referring now primarily to FIG. 5, a digital up/down counter 82 is coupled to a conventional digital-to-analog converter 84 and the output signal from the converter 84 is applied on the lead 54 to the summation circuit 46 (FIG. 3). The counter 82 may consist, for example, of four flip-flop stages to yield sixteen output stages. The counter may be initially set in the center of the range, for example at the count of eight and a control signal applied to the lead 48 will cause the counter to count up one, and a control signal applied to the lead 50 will cause the counter to count down one number. The digital number contained in the counter 82 is converted to an analog voltage in the digital-to-analog converter 84. The magnitude of the output signal from the converter 84 is therefore directly proportional to the number, stored in the counter 82.

In the operation of the frequency tracking system in accordance with the principles of the subject invention, the input signal applied from the source 30 to the mixer 32 is heterodyned with the output signal of the voltage control oscillator 34 to form a line spectrum (FIG. 2). One spectral line is transmitted by the narrow band filter 36 and, after amplification by the amplifier 38, is applied to the discriminator 40. The amplitude and polarity of output signal of the discriminator are indicative of the frequency difference of the input signal applied thereto relative to a fixed predetermined frequency, for example $f_a$. The output signal from the discriminator 40 is filtered and amplified by the filter amplifier 42 and then applied through the summation circuit 46 to voltage control oscillator 34. The oscillator 34 tracks the frequency of the spectral line transmitted by the narrow band filter 36 so that the spectral line is centered at the selected frequency (for example $f_a$). If the spectral line acquired by the frequency tracking circuit of the subject invention is the central spectral line, i.e., the pulse repetition frequency insensitive line, there is no change in frequency when the signal source 30 changes the pulse repetition frequency or the sampling frequency of the signal generated therein. However, if the spectral line that the circuit 28 is tracking is higher in frequency than the central line, then the frequency of the signal applied to the discriminator 40 will increase if the pulse repetition frequency is increased and it will decrease if the pulse repetition frequency is decreased. Likewise the reverse is true, in that if the spectral line being tracked by the frequency tracking circuit 28 is lower in frequency than that of the central line, then the frequency of the signal applied to the discriminator 40 will decrease if the pulse repetition frequency had been increased and it will increase if the pulse repetition frequency has been decreased.

During pulse repetition frequency change intervals, transient signals are produced in the output signal of the discriminator 40 if the tracking circuit 28 is locked to any spectral line other than the central line. The transient signal will be either positive or negative depending on which spectral line the frequency tracking circuit 28 is locked to and whether the pulse repetition frequency had been increased or decreased. The decision circuit 44 generates a positive signal at the terminal 68 if the frequency of the signal applied to discriminator 40 had been increased, and generates a positive signal at the terminal 72 if the frequency of the signal applied to the discriminator 44 had been decreased. The terminal 68 is then coupled either to lead 50 or 48 depending on whether coil 76 is activated or inactivated, respectively. In a like manner, terminal 72 is either coupled to lead 48 or 50 depending on whether coil 76 is activated or inactivated, respectively.

The control signals generated at the terminals 78 and 80 are applied on the leads 48 or 50 to the up/down stepper circuit 52. The magnitude of each voltage step of the output signal of the stepper 52 corresponds to the voltage change needed to index the voltage controlled oscillator 34 by an amount approximately equal to the average pulse repetition frequency. It should be noted that the frequency shift induced by the stepper 52 need only be of sufficient precision as to place a selected adjacent spectral line within the bandwidth of the filter 36 so that the discriminator 40 can respond thereto. Each time the pulse repetition frequency is changed, the frequency tracking circuit 28 makes a determination as to whether the spectral line being tracked is correct, low or high. If an incorrect spectral line is being tracked, the frequency of the voltage controlled oscillator is incremented one spectral line at a time until the central line is acquired.

The system performance characteristic of the illustrated arrangement may be summarized as:

If when the pulse repetition frequency is changed there is not an output transient from the discriminator 40, a control signal is not generated and the tracking system 28 is tracking the central spectral line;

If the pulse repetition frequency is increased and the output transient is positive, the decision circuit 44 controls the up/down stepper 52 to step down one voltage increment;

If the pulse repetition frequency is increased and the output signal, from the discriminator 40, contains a negative transient signal, then the decision circuit 44 controls the up/down stepper 52 to step up one voltage increment;

If the pulse repetition frequency is decreased and the output signal, from the discriminator 40, contains a positive voltage transient, the decision circuit 44 commands the up/down stepper 52 to step up one voltage increment;

If the pulse repetition frequency and the discriminator output signal is negative, the decision circuit 44 commands the up/down stepper 52 to step down one voltage increment.

Thus there has been described a frequency tracking circuit which has the unique capability for tracking the central spectral line of a pulsed input signal. Although a selected preferred embodiment has been described herein with particularity, it is understood that many changes or modifications thereto may be made without departing from the scope of the subject invention. For example, up/down stepper 52 could be mechanized by a conventional up/down analog integrator which integrates up when a signal is applied to a first input terminal and integrates down when a signal is applied to a second input terminal. The control signals applied to the analog integrator could be adjusted in amplitude and/or time duration so that the output signal from the analog integrator would be incremented a given voltage step in response to each input control pulse.

What is claimed is:

1. An apparatus for frequency tracking a selected spectral line of an input signal comprising:
   first means for frequency tracking one of a plurality of spectral lines of the input signal;
   second means for determining the spectral relationship between the spectral line being tracked by said first means and a selected spectral line; and
   control means, responding to said second means, for controlling said first means to frequency track the selected spectral line.

2. In combination with a source of a coherent pulsed input signal, said source having means for varying the pulse repetition frequency of the input signal and means for generating a logic signal representative of the spectral direction of the pulse repetition frequency change, a frequency tracking device comprising:
   first means for frequency tracking one of a plurality of spectral lines of the input signal;
   second means, coupled to said first means and responding to the logic signal, for determining the spectral relationship between the spectral line being tracked by said first means and a selected spectral line; and
   control means responding to said second means for controlling said first means to frequency track the selected spectral line.

3. The combination of claim 2 wherein:
   said first means includes a discriminator having an output circuit, and a summation circuit having an input circuit;
   said second means includes a decision circuit having a first input circuit coupled to said output circuit of said discriminator and having a second input circuit to which said logic signal is applied, and having an output circuit; and
   said control means includes a stepper circuit having an input circuit coupled to said output circuit of said decision circuit and having an output circuit coupled to said input circuit of said summation circuit.

4. The combination of claim 3 wherein said decision circuit includes first and second gate circuits; and a switching device, having an input circuit coupled to said first and second gate circuits, and responding to said logic signal wherein said switching device generates a first control signal when the spectral line being tracked by said first means is above a first predetermined frequency, and generates a second control signal when the spectral line being tracked by the said first means is below said first predetermined frequency.

5. The combination of claim 4 wherein said stepper circuit comprises a digital up/down counter coupled in series to a digital-to-analog converter.

6. In combination with a source of pulsed input signals having means for varying the pulse repetition frequency of the input signals and means for generating a logic signal representative of the spectral direction of the pulse repetition frequency change, a frequency tracking device comprising:
   a mixer having a first input circuit to which the input signals are applied, having a second input circuit and having an output circuit;
   a filter having an input circuit coupled to the output circuit of said mixer, and having an output circuit;
   a discriminator having an input circuit coupled to the output circuit of said filter, and having an output circuit;
   a summation circuit having a first input circuit coupled to the output circuit of said discriminator, having a second input circuit and having an output circuit;
   a decision circuit having a first input circuit coupled to the output circuit of said discriminator, having a second input circuit to which said logic signal is applied, and having an output circuit;
   a stepper having an input circuit coupled to the output circuit of said decision circuit and having an output circit coupled to the second input circuit of said summation circuit; and
   a voltage controlled oscillator having an input circuit coupled to the output circuit of said summation circuit and having an output circuit coupled to said second input circuit of said mixer.

7. The combination of claim 6 wherein said decision circuit comprises:
   a first AND gate having a first input circuit coupled to the output circuit of said discriminator, having a second input circuit, and having an output circuit;

an inverter circuit having an input circuit coupled to to the outpt circuit of said discriminator and having an output circuit;

a second AND gate having a first input circuit coupled to the output circuit of said inverter, having a second input circuit, and having an output circuit;

a voltage source having an output circuit coupled to the second input circuits of said first and second AND gates; and a relay having first and second signal input terminals coupled to the output circuits of said first and second AND gates, respectively, and having a control input circuit to which is applied the logic signal.

8. The combination of claim 7 wherein said stepper circuit comprises a digital up/down counter coupled in series to a digital-to-analog converter.

References Cited

UNITED STATES PATENTS 2,862,203   11/1958   Skaraeus et al.
3,295,127   12/1966   Kross _____ 343—7

RICHARD A. FARLEY, Primary Examiner

U.S. Cl. X.R.

331—10; 343—8